United States Patent [19]

Wohlford

[11] 4,451,097

[45] May 29, 1984

[54] TRACK SECTION INCLUDING FLEXORS

[75] Inventor: William P. Wohlford, Bettendorf, Iowa

[73] Assignee: Deere & Company, Moline, Ill.

[21] Appl. No.: 344,672

[22] Filed: Feb. 1, 1982

[51] Int. Cl.³ .................... B62D 55/24; B62D 55/28
[52] U.S. Cl. ................................. 305/40; 16/225; 16/372; 305/43
[58] Field of Search .............. 305/35 R, 35 EB, 36, 305/38, 40, 43; 198/850–853; 16/225, 372, DIG. 13

[56] References Cited

U.S. PATENT DOCUMENTS

| | | | |
|---|---|---|---|
| 1,966,450 | 7/1934 | Knox | 305/10 |
| 2,410,507 | 11/1946 | Knight | 305/10 |
| 2,494,066 | 1/1950 | Slemmons | 305/38 |
| 2,515,128 | 7/1950 | Lammertse | 305/38 |
| 3,346,306 | 10/1967 | Siber | 305/40 |
| 3,625,574 | 12/1971 | Plastino | 305/40 |

Primary Examiner—David A. Scherbel

[57] ABSTRACT

A track-laying tractor drive track is composed of a plurality of sections which each include a link and a grouser bolted together in sandwiching relationship to a pair of side-by-side disposed flexors. The flexors each include a plurality of superposed, resilient plates encased in an elastomeric material. A lost motion connection between the plates and the link and grouser acts such that tensile loads are simultaneously carried by at least two plates both when the flexor is flat and when the flexor is bent without the plates becoming overstressed when bent. Each link includes first and second transverse bars respectively, adapted for entering adjacent receptacles formed by the teeth of a drive sprocket. A wear cap is held in place on the first transverse bar by adjacent grousers of the track while the second transverse bar includes teeth for cleaning material from the sprocket receptacles.

19 Claims, 9 Drawing Figures

TRACK SECTION INCLUDING FLEXORS

BACKGROUND OF THE INVENTION

The present invention relates to drive tracks for track-laying vehicles and more particularly relates to track sections embodying flexors for interconnecting and providing flexure between adjacent sections.

Conventional tracks for track-laying vehicles include a plurality of track sections comprising sets of right- and left-hand rail portions which are interconnected by pin and bushing assemblies that define pivot joints for permitting relative pivotal motion between adjacent track sections. A major problem with these conventional tracks is that during operation considerable wear occurs in the pivot joints. This results in the track becoming elongated to the extent that the track no longer properly engages the track drive sprocket with the result that the track sometimes jumps teeth or completely comes off the sprocket. Final drive damage may result as a consequence of such operation.

Even though it is often possible to repair the track by replacing the pin and bushings or by turning the bushings once a predetermined amount of wear has occurred, such repair is costly and time-consuming and can only be accomplished by using specially designed fixtures and presses.

Designers have attempted to eliminate the aforementioned problems with conventional tracks by developing tracks having sections which embody flexors that interconnect and permit flexure between adjacent sections. For the most part, these flexors have included metal cables or plates for carrying the tensile loads to which the track is subjected during operation. Examples of such flexors are disclosed in U.S. Pat. No. 1,966,450, issued to Knox on July 17, 1934; U.S. Pat. No. 2,410,507, issued to Knight on Nov. 5, 1946; U.S. Pat. No. 3,346,306, issued to Siber on Oct. 10, 1967; and U.S. Pat. No. 3,625,574, issued to Plastino on Dec. 7, 1971.

These prior art flexor designs suffer from one or more of the shortcomings of: (1) having tension-carrying members which elongate excessively under load, thus resulting in the tracks meshing improperly with their drive sprockets, (2) having tension-carrying members which are not anchored properly, (3) having tension-carrying members which fail prematurely due to combined bending and tensile stresses, and (4) being too complicated in construction for easy and economical mass production.

SUMMARY OF THE INVENTION

According to the present invention, there is provided an improved track section design embodying flexors for interconnecting and providing flexure between adjacent sections.

An object of the invention is to provide a simply constructed track section embodying one or more flexors including a resilient member arranged for transferring tensile loads between sections without becoming excessively elongated and without failing prematurely due to combined tensile and bending stresses.

A more specific object is to provide a track link section embodying one or more flexors including at least a pair of superposed, thin plates and having their opposite ends anchored so as to permit relative lengthwise movement between the plates when the flexor bends.

Another object of the invention is to provide a flexor including a resilient core for carrying tensile loads with the flexor being embodied in a track section including surfaces which cooperate with surfaces of an adjacent track section to control the bending radius of the flexor as the track section travels along the ground and about a drive sprocket so that the bending stresses in the resilient core are maintained within an allowable range.

Yet another object of the invention is to provide a track section comprising a link and a grouser secured together in sandwiching relationship to one end of each of one or more flexors which each have a second end adapted for being sandwiched between a link and a grouser of an adjacent track section.

These and other objects will become apparent from a reading of the ensuing description, together with the appended drawings.

DESCRIPTION OF THE PREFERRED EMBODIMENT

Figure 1:
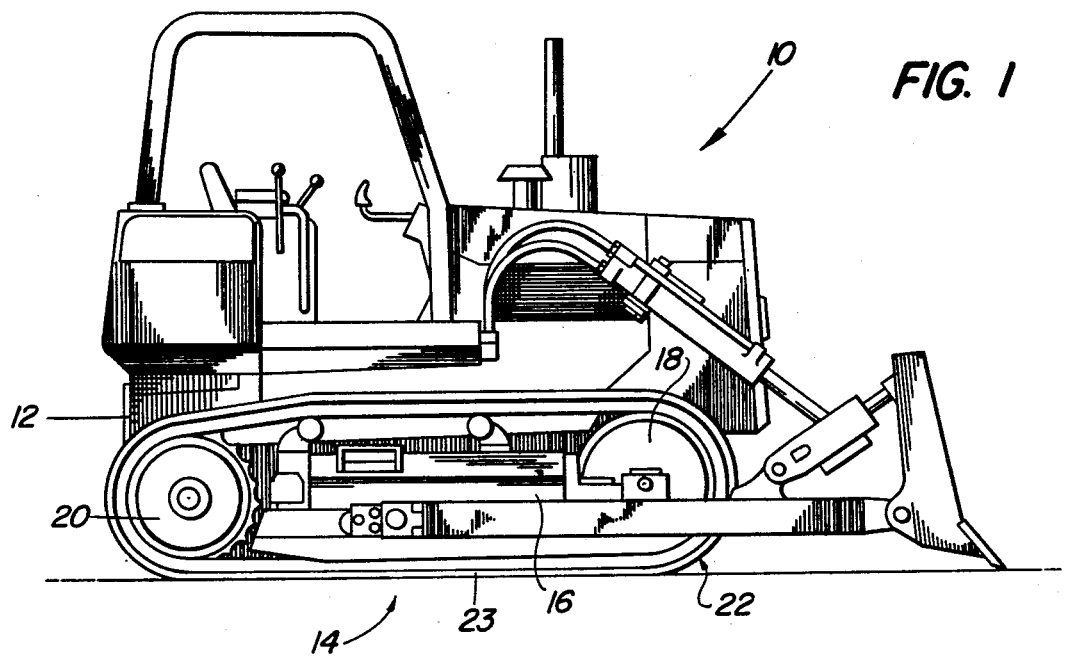
FIG. 1 is an elevational view of the right-hand side of a track-laying tractor embodying a track constructed in accordance with the present invention.

Referring now to FIG. 1, therein is shown a crawler tractor 10, which typifies the type of vehicle with which the present invention is particularly suited for use. The tractor 10 includes a main frame 12 supported on track assemblies 14 (only one shown) extending longitudinally at the opposite sides thereof. Each track assembly 14 includes a track frame 16 having an idler wheel 18 slidably supported on the forward end thereof. Supported from the frame 12 and disposed in fore-and-aft alignment with the wheel 18 is a drive sprocket 20. An endless drive track 22 is trained about the wheel 18 and sprocket 20 and has a lower run 23 engaged with the ground. It is here noted that the description of various components of the track contained hereinbelow is made as though the components were located in the lower run and viewed by a person facing in the direction of forward travel of the vehicle, as indicated by the arrow A.

Figure 2:
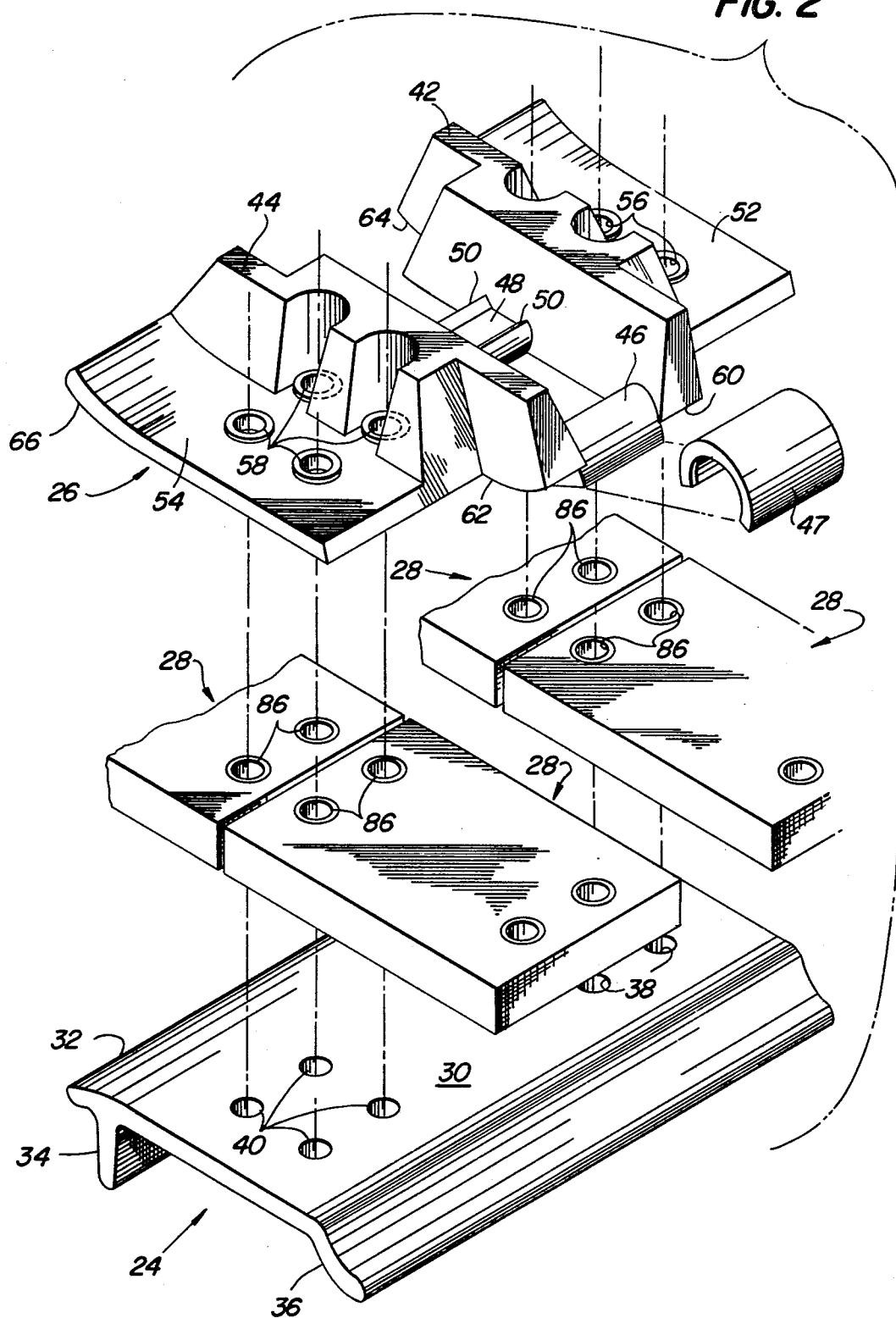
FIG. 2 is an exploded perspective view showing a track section, with fasteners absent, constructed in accordance with the present invention and end portions of a pair of flexors of an adjacent track section.
Figure 3:
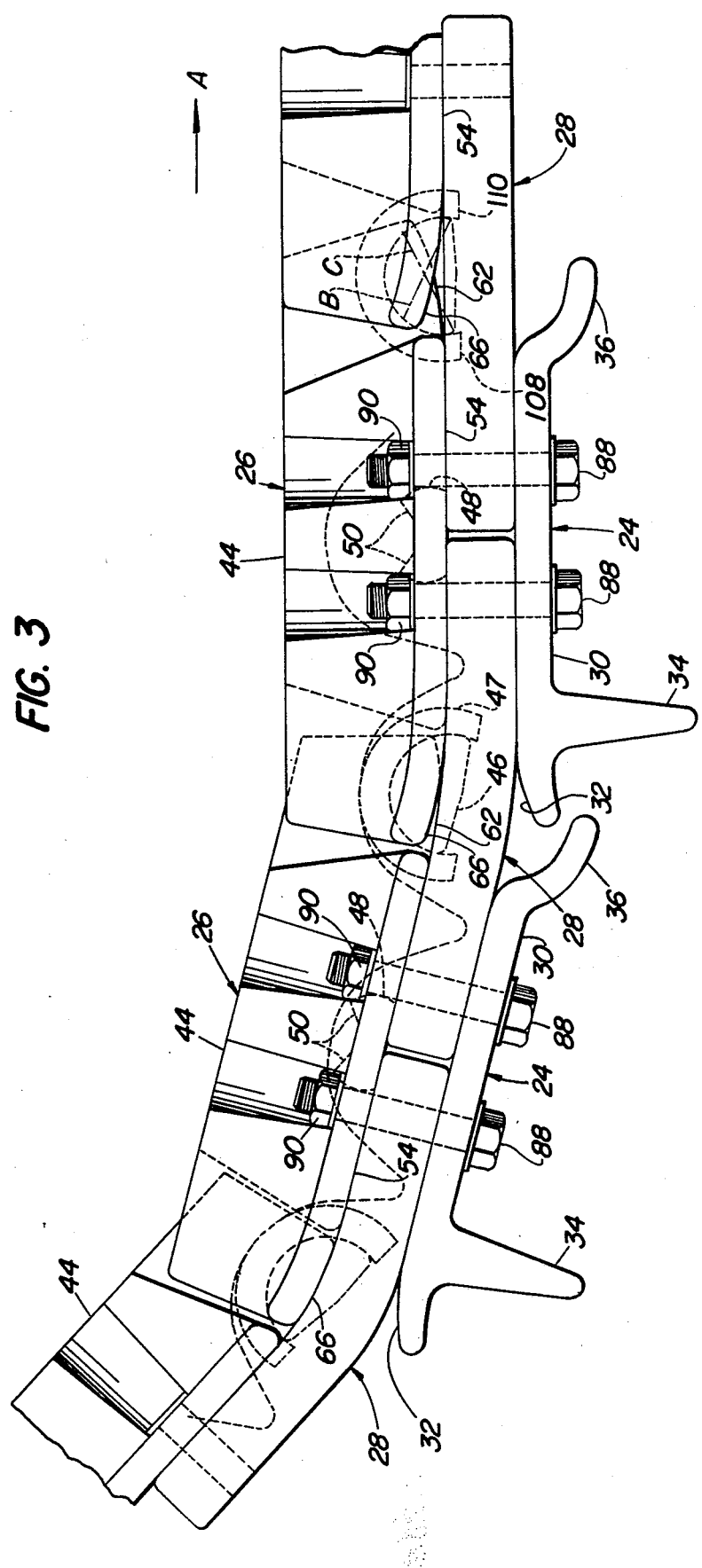
FIG. 3 is a right side elevational view showing a segment of the track meshed with the drive sprocket.

Referring now to FIGS. 2 and 3, it can be seen that the drive track 22 comprises a plurality of identical grousers 24, track links 26 and flexors 28. Each grouser is bolted to a track link in sandwiching relationship to respective first end portions of a pair of flexors to form a track section. The grouser and track link of an adjacent track section are bolted together in sandwiching relationship to respective second end portions of the pair of flexors whereby the pair of flexors serve to interconnect and provide flexure between the adjacent track sections.

More specifically, each grouser 24 includes a central flat portion 30 located between a rear end portion defining an upwardly convex upper surface 32 and a transverse, depending cleat 34, and a downwardly- and forwardly-curved forward end portion 36. The forward end portion 36 of a first grouser is located beneath and in overlapping relationship to the rearward end portion of an adjacent grouser. Inner and outer sets of bolt holes 38 and 40, respectively, having four holes in each set, are provided in the flat portion 30 of the grouser in transversely spaced, side-by-side relationship to each other.

Each track link 26 includes transversely spaced, inner and outer rail portions 42 and 44, respectively, which have their forward ends joined by a sprocket-engaging portion comprising a base in the form of a generally semi-cylindrical, transverse bar 46 and a wear cap 47 received on the bar. The wear cap 47 is in the form of a cylindrical bushing segment which is slightly more than semi-cylindrical. The rail portions 42 and 44 are also joined together by a sprocket receptacle cleaner portion defined by a second bar 48 located about halfway between the front and rear ends of the rail portions. The second bar 48 is formed to define a pair of transverse ridges or teeth 50 having a purpose described hereinbelow. Formed integrally with the bottoms of the rail portions 42 and 44 are respective plate portions including respective inner and outer central flat portions 52 and 54. The inner flat portion 52 is provided with a set of four bolt holes 56 arranged in alignment with the set of holes 38 provided in the grouser 24. Similarly, the flat portion 54 is provided with a set of four bolt holes 58 arranged in alignment with the set of holes 40 provided in the grouser 24. The forward end portions of the flat portions 52 and 54 terminate short of respective forward end portions of the rail portions 42 and 44, which have under surfaces 60 and 62, respectively, that are arcuately curved upwardly. The under surface of the rear end portions of the rails 42 and 44 and the rear end portions of the plate portions of the link 26 are also arcuately curved upwardly, as at 64 and 66, the surfaces 60 through 66 having a purpose explained in more detail hereinbelow.

Figure 4:
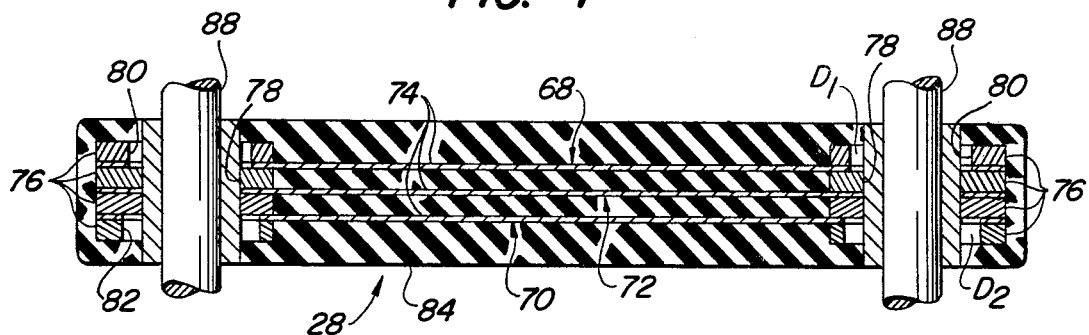
FIGS. 4 through 6 are schematic vertical sectional views taken lengthwise through one set of mounting holes of a flexor having a core comprising three plates and respectively showing the flexor in an unloaded flat condition, a loaded flat condition and a loaded, bent condition.
Figure 5:
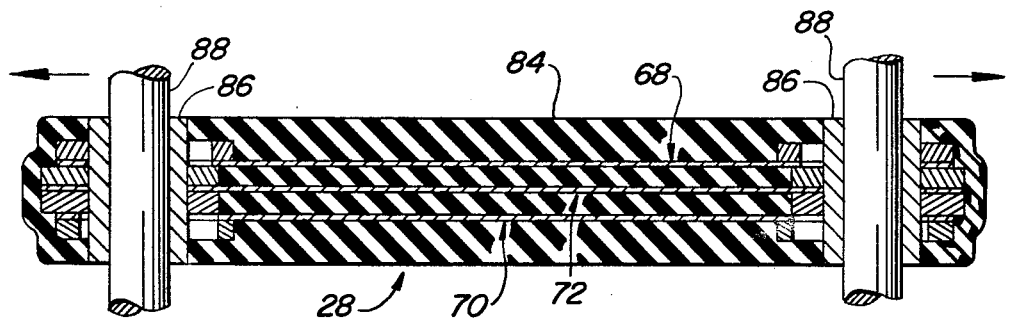
Figure 6:
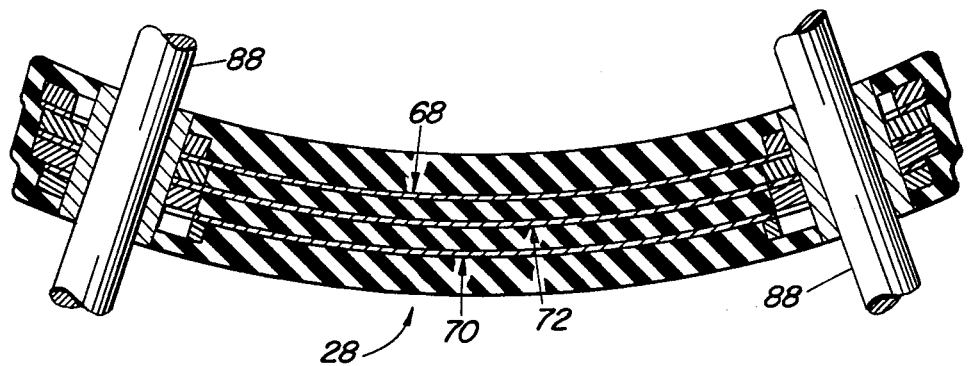

Referring now to FIGS. 4 through 6, it can be seen that each of the flexors 28 includes upper, lower and intermediate superposed rectangular plates 68, 70 and 72, respectively. The plates are each composed of main sections 74, which extend over the entire length of the plates, and of end section 76, which are bonded by structural adhesive to opposite end portions of the main sections 74 whereby the opposite end portions of the plates are reinforced. It is here noted that, for the sake of symmetry, the main section 74 of the intermediate plate 70 has end sections 76 bonded to both the upper and lower surfaces thereof while the main section of the upper plate 68 has end sections bonded only to its upper surface, and the main section of the lower plate 72 has end sections bonded only to its lower surface. While the composite plates are preferred, it is to be understood that one-piece plates could be used.

The reinforced end portions of the intermediate plate 70 are each provided with a pair of side-by-side disposed mounting holes 78 while the reinforced ends of the upper plate 68 are each similarly provided with pairs of mounting holes 80, and the reinforced ends of the lower plate 72 are each similarly provided with pairs of mounting holes 82. The pairs of mounting holes 78 at each end of the intermediate plate are respectively in axial alignment with the pairs of mounting holes 80 and 82 at each end of the upper and lower plates 68 and 72. For a purpose set forth in detail below, the diameters of the pairs of mounting holes 80 and 82 are respectively larger and smaller than the diameters of the pairs of mounting holes 78, this difference in size being shown exaggerated in the drawing.

The plates 68, 70 and 72 may be made of any material having the requisite strength for transferring the desired load while having the resiliency necessary to bend when the track moves about the drive sprocket. In the preferred embodiment, the plates are made of stainless steel and are protected from abrasive materials by an elastomeric covering or encasement 84. Other metals may be used in which case the covering 84 would also serve to protect the plates from corrosive elements.

A bushing 86 is located in each group of aligned holes of the plates. The bushings 86 are sized to fit tightly within the mounting holes 78 of the intermediate plate 72. As can be seen in FIGS. 2 and 3, the pair of flexors 28 of each track section are held sandwiched in plate between the link 26 and the grouser 24 by means of four connection bolts 88, which extend upwardly through inner and outer pairs of the sets of holes 38 and 40 of the grouser, through the pair of bushings 86 in respective first ends of the pair of flexors and through inner and outer pairs of the sets of holes 56 and 58 of the link 26. The unused ones of the sets of holes of the link and grouser are used in securing the respective free ends of the pairs of flexors of an adjacent track section in place between the link and grouser. The bolts 88 have nuts 90 received thereon and tightened down so as to clamp the link and grouser against the bushings 86, as well as the flexors 28, the bushings serving to establish a metal-to-metal connection between the link and grouser to ensure that the nuts 90, when properly torqued, will not loosen during operation as might otherwise be the case if the link and grouser were clamped only against the elastomeric-covered flexors 28.

Although the track sections disclosed herein are of a type adapted to mesh with a drive sprocket having a single set of teeth, track sections could be used which have sprocket engaging members projecting from opposite sides thereof so as to respectively engage the rows of teeth of a sprocket having a double set of teeth. In this latter case only a single flexor would be required, and it would be located so as to pass between the double set of teeth.

As illustrated in FIG. 4, the flexor 28 is in a flat, unloaded condition wherein no clearance exists between the bushings 86 and the mounting holes 78 of the intermediate plate 72, a clearance $D_1$ exists between the bushings 86 and the mounting holes 80 of the upper plate 68, and a clearance $D_2$ exists between the bushings 86 and the mounting holes 82 of the lower plate 70. As will be apparent from reading the description below, the respective clearances $D_1$ and $D_2$ here shown at the opposite ends of the plates 68 and 70 could be added and provided at only one of the ends of the plates.

As load is applied through the bolts 88 to place the flexor 28 in tension, the entire load is initially carried by the intermediate plate 72. When the plate 72 yields elastically through a distance equal to the clearance $D_1$, the upper plate 68 will begin to share the load with the intermediate plate. This flat, loaded condition is illustrated in FIG. 5.

As the flat, loaded flexor 28 moves about the drive sprocket 20, it becomes flexed or bent. Thus, the flexor is then loaded both in tension and in bending. As bending occurs, the right- and left-hand ends of the upper plate 68 respectively shift rightwardly and leftwardly, and the right- and left-hand ends of the lower plate 70 respectively shift leftwardly and rightwardly, relative to the right- and left-hand ends of the intermediate plate 72. This boundary displacement between the plates occurs due to the bend of the flexor 28 being on increasingly larger radii going from the upper to the lower plate and is permitted to occur without undue stress by virtue of the clearances $D_1$ and $D_2$. Attendant with this bending, the load sharing changes from being between the intermediate and upper plates 72 and 68 to being between the intermediate and lower plates 72 and 70. This condition is the loaded, bent condition shown in FIG. 6.

Figure 7:
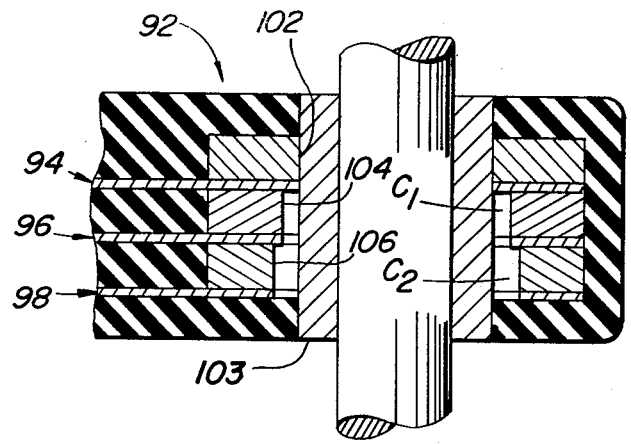
FIGS. 7 through 9 are schematic vertical sections similar to FIGS. 4 through 6 but showing an alternate form of flexor having differently arranged plates.
Figure 8:
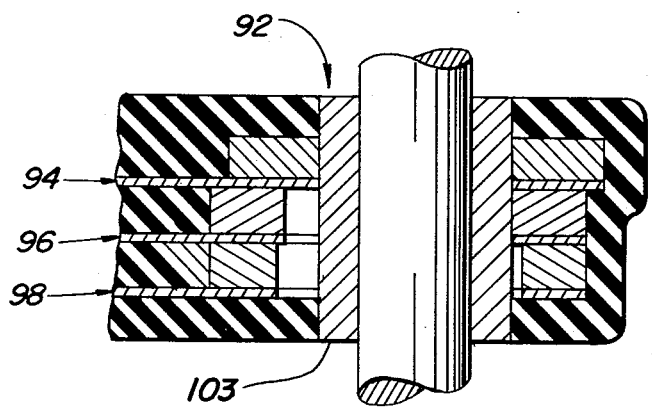
Figure 9:
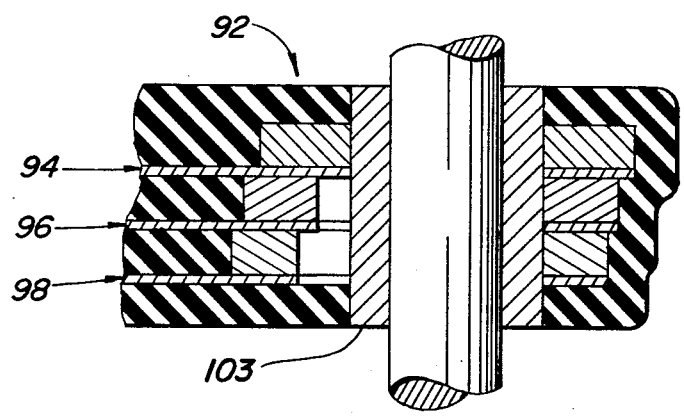

Referring now to FIGS. 7 through 9, therein is shown an alternate flexor embodiment indicated in its entirety by the reference numeral 92. The flexor 92 includes three resilient, rectangular plates 94, 96 and 98, as considered serially from top to bottom. In this embodiment, sets of mounting holes 102 (only one of each set shown) at the opposite ends of the upper plate 94 are sized to fit closely about bushings 103 disposed therein while sets of mounting holes 104 and 106 respectively of the plates 96 and 98 are sized to provide increasing clearances $C_1$ and $C_2$ between the bushings 86 and the plates 96 and 98, as best seen when the flexor 92 is in a flat, unloaded condition as illustrated in FIG. 7.

As the flexor 92 becomes loaded in tension, the entire load is initially carried by the upper plate 94 which elongates elastically through the distance $C_1$ whereupon the second plate 96 begins to share the load, as shown in FIG. 8. Then, as the flexor 92 begins to move around the drive sprocket, it bends and is therefore additionally loaded in bending. As the bending takes place, the plates 94, 96 and 98 shift relative to each other and end up in the configuration illustrated in FIG. 9 wherein all of the plates are sharing the tensile load.

Thus, it will be appreciated that the initial selection of the number of plates and the selection of the clearances between the bushings and the mounting holes of the plates determine the balance of load sharing between the plates.

While the number of flexor plates shown here is three for each of the first and second described embodiments, it is to be understood that the number of plates used for any given application will depend upon the amount of force required to be transferred between track sections and the radius of curvature of the bend that the plates must go through as they travel around the drive sprocket.

Referring now to FIGS. 2 and 3, it can be seen that the radius of flexure of the flexors 28 is controlled by the under surfaces 60 and 62 of a first one of the links 26 and the under surfaces 64 and 66 of an adjacent one of the links 26, the positioning of the adjacent links relative to each other being governed by the radius of the drive sprocket 20 with which the links are engaged. The radius of flexure or bending of the flexors in the opposite direction is controlled somewhat by the curved end portion 32 of one of the grousers and is limited by interference occurring between the curved end portion 36 of one grouser 24 and the cleat 34 of an adjacent one of the grousers 24.

With reference to FIGS. 2 and 3, it can be seen that the transverse bar 46, and hence the wear cap 47, of each link 26, is located above the overlapped end portions 32 and 36, respectively, of an adjacent pair of the grousers 24. Opposite transversely-extending ends 108 and 110 of the wear cap 47 are located in such proximity to these end portions 32 and 36 that movement of the wear cap 47 one way or the other about the bar 46 is limited.

Referring now to FIG. 3, diameters B and C are drawn on the end of the bar 46 so as to extend from the left- and right-hand ends of the arcuate surface of the bar. When the wear cap 47 is positioned on the bar 46 with its ends 108 and 110 respectively located below the points of intersection of the diameters B and C with the arcuate surface of the bar, the cap 47 will be locked on. The adjacent ones of the grousers 24 to the ends 108 and 110 of a given wear cap 47 are located so as to prevent the ends 108 and 110 from respectively moving above the intersection of the lines B and C with the arcuate surface of the bar 46, and consequently the wear cap 47 is maintained in place for so long as the adjacent grousers are in place. Once one of the grousers is loosened or removed, the wear caps adjacent the opposite ends of the loosened or removed grouser may be rotated so as to move one end or the other of the wear cap above one or the other of the intersections of lines A and B with the arcuate surface of the bar 46 so as to permit the removal of the wear cap.

The operation of the track 22 is thought to be clear from the foregoing description and for the sake of brevity is not repeated here.

I claim:

1. A track section adapted for interconnection with a plurality of like sections to form an endless drive track for a track-laying vehicle, comprising: at least one flexor; said flexor including at least two superposed, generally rectangular, resilient plates, which constitute a radially inner plate and a radially outer plate relative to the flexor being flexed for travelling about a drive sprocket; a track link; a grouser; said link and grouser having first and second flat surfaces, respectively, opposed to each other and having an end portion of said flexor located therebetween, a first pair of side-by-side mounting holes extending through said link, flexor and grouser; a first pair of fastener means respectively received in said pair of mounting holes and respectively including a pair of bolts; said inner plate having a tight connection with said pair of bolts; and said outer plate having a clearance connection with said pair of bolts with the clearance being such that both plates carry a desired tensile load without either plate being overstressed when the flexor is bent as when travelling about a drive sprocket.

2. The track section defined in claim 1 wherein said flexor includes a third plate located between said inner and outer plates; and said third plate having a clearance fit with said pair of bolts which is less than the clearance fit of the outer plate with said pair of bolts, with said clearance fits being chosen such that all three plates carry the desired tensile load without undergoing undue stress when the flexor is bent as when travelling about a drive sprocket.

3. The track section defined in claim 1 wherein the flexor includes a third plate located inwardly of said outer plate and having a clearance fit with said pair of bolts which is less than the clearance fit that said outer plate has with the pair of bolts, said clearance fits being such that the inner and third plates carry a predetermined tensile load when the flexor is flat and the inner, third and outer plates carry the predetermined tensile load when the flexor is bent as when travelling about a drive sprocket.

4. The track section defined in claim 1 wherein each of said plates has opposite end portions which are of increased thickness.

5. The track section defined in claim 1 wherein each of said plates comprises a first part defined by a main section of uniform thickness extending the full length of the plate and first and second end sections respectively bonded to opposite end portions of the main section by a structural adhesive.

6. The track section defined in claim 5 wherein said plates are constructed of stainless steel.

7. The track section defined in claim 1 wherein the track link includes a third flat surface disposed in side-by-side, spaced relationship to the first surface of the track link; and a second flexor having a construction similar to said one flexor and being secured between the second surface of the grouser and the third surface of the link by a second pair of fastener means including a second pair of bolts.

8. The track section defined in claim 7 wherein said track link includes a pair of transversely spaced rail portions joined at one end thereof by a sprocket-engaging portion; and said pair of flexors being located to extend on opposite sides of the sprocket-engaging portion.

9. The track section defined in claim 1 wherein each of the pair of bolts has a bushing received thereon; and opposite ends of each bushing being respectively engaged by the first and second flat surfaces.

10. The track section defined in claim 1 wherein the opposite ends of the track link have curved surface means facing the flexor and being adapted for cooperation with similar curved surface means of an adjacent track section for controlling the bending radius of the flexor as it travels about a drive sprocket.

11. A flexor for use in interconnecting adjacent members of an endless track assembly, comprising: at least first and second superposed, generally rectangular, resilient plates; an elastomeric covering encasing the plates; each plate having a pair of holes in each end thereof with the holes in the second plate being larger than and respectively axially aligned with the holes in the first plate; and fastener means, sized in accordance with the holes in the first plate, being received in each aligned set of holes to thereby establish a lost motion connection between the first and second plates for permitting them to slide relative to one another during flexure while establishing a connection whereby both plates share in transferring tensile loads when the fastener means are loaded in a direction lengthwise of the flexors.

12. The flexor defined in claim 11 wherein each fastener means includes a bushing received in each of the aligned sets of holes and tightly engaging the holes of the first plate, and a bolt received in and snugly fitting in each bushing.

13. A flexor adapted for forming part of a track section of a track-laying vehicle track, comprising: at least first, second and third superposed, generally rectangular resilient plates stacked together to form a resilient body; each plate being provided with a pair of side-by-side disposed mounting holes at each of its opposite ends with the respective pairs of holes of the plates being axially aligned so as to form two mounting hole sets at each end of the body; and at least the respective sizes of one pair of side-by-side disposed holes of each plate being different one from the other, whereby insertion of a fastening means in each mounting hole set including means for snugly fitting the smaller of the holes of the plates will result in a lost motion connection being established between the plates for permitting the latter to shift lengthwise relative to each other during bending of the flexor.

14. A flexor as defined in claims 11 or 13 wherein the plates are made from stainless steel.

15. A flexor as defined in claims 11 or 13 wherein the plates are made from stainless steel; and elastomeric material encasing said plates.

16. The flexor as defined in claims 11 or 13 wherein the opposite ends of the plates in respective areas pierced by said pairs of holes having a thickness which is greater than the thickness of the remainder of the plate.

17. The flexor as defined in claims 11 or 13 wherein the plates each include a main section of uniform thickness extending over the length of the flexor, and a pair of reinforcing sections in the form of narrow plates respectively bonded to the opposite end of the main section in crosswise relationship to the length thereof.

18. The flexor as defined in claim 13 wherein the second plate is located between the first and third plates and the pairs of mounting holes of the second plate are the smaller of the dimensions of the respective pairs of holes of the plates.

19. The flexor as defined in claim 13 wherein the first, second and third plates are serially arranged and the dimension of at least one of the pairs of mounting holes of the plates increasing from the first to the third plate.

* * * * *